(No Model.)

C. P. DORR.
SPRING LOCKING NUT.

No. 510,245. Patented Dec. 5, 1893

WITNESSES:
John A. Rennie
C. Sedgwick

INVENTOR
C. P. Dorr
BY
Munn & Co
ATTORNEYS.

UNITED STATES PATENT OFFICE.

CHARLES P. DORR, OF ELLSWORTH, MAINE.

SPRING LOCKING-NUT.

SPECIFICATION forming part of Letters Patent No. 510,245, dated December 5, 1893.

Application filed September 11, 1893. Serial No. 485,225. (No model.)

*To all whom it may concern:*

Be it known that I, CHARLES P. DORR, of Ellsworth, in the county of Hancock and State of Maine, have invented a new and Improved Spring-Nut, of which the following is a full, clear, and exact description.

My invention relates to improvements in that class of devices which are adapted to lock a nut in place; and the object of my invention is to produce a simple form of spring nut which may be applied to any ordinary bolt, and which is provided with spring arms adapted to press against an object through which the bolt of the nut extends, so as to take up all slack and prevent the nut from getting loose.

To this end my invention consists of a spring nut, the construction of which will be hereinafter described and claimed.

Reference is to be had to the accompanying drawings forming a part of this specification, in which similar figures of reference indicate corresponding parts in all the views.

Figure 1:
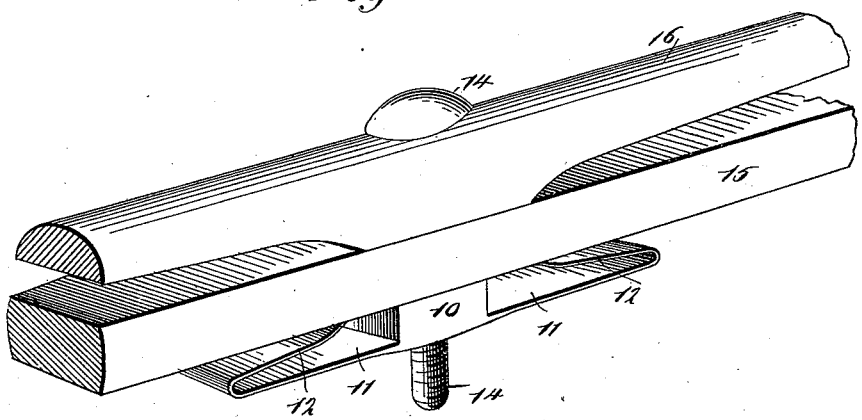
Figure 2:
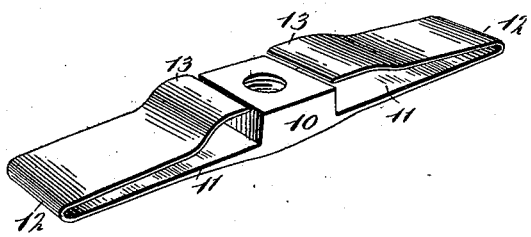
Figure 3:
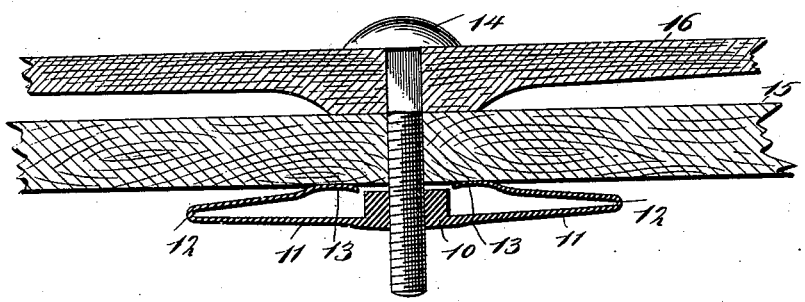

Figure 1 is a perspective view of my improved spring nut as applied to a whiffletree bolt. Fig. 2 is a detail perspective view of the nut; and Fig. 3 is a sectional view of the nut and bolt and of the whiffletree and cross bar.

The nut 10 is substantially like an ordinary nut and, as illustrated, is a square nut, although it may be octagonal or hexagonal if desired and it has projecting from opposite sides arms 11 which are parallel with one of the plane faces of the nut, and which preferably are doubled and returned upon themselves, as shown at 12, the arms terminating at their free ends in outer or upper bends 13 which are adapted to press against the adjacent surface to which the nut and its bolt are secured, and these free ends of the arms have a spring action so as to yield when necessary, but they are sufficiently stiff to press firmly against an adjacent surface. It will be seen that the opposed ends of the returned members of the spring arms are spaced apart a distance greater than the size of the bore of the nut proper or body 10, and this permits a free movement of the arms along the bolt and thus prevents engagement of the arms with the bolt and allows the arms to come to a bearing against the surface of a wagon sand bar, a fish plate, or other part to be bolted and to exert a proper spring pressure against such surface. A further distinguishing characteristic of the device is the relative thickness of the arms and the body or nut proper. Thus normally, the ends 13 of the returned members of the arms lie in a plane beyond the inner face of the nut and when the latter is forced home to get a solid bearing against the surface of the part to which the bolt and nut are applied, the arms will recede within the plane of the nut while exerting the proper spring pressure and will permit screwing home of the nut.

The nut, as shown in the drawings, is applied to a bolt 14, which forms the pivot of a whiffletree 16 and extends through the cross bar 15 to fasten the whiffletree to the said cross bar. The nut is peculiarly adapted for places of this kind where the bolt is likely to be turned, as the pressure of the spring arms holds it in place and takes up the slack of the adjacent parts. The nut, however, is not restricted to the use illustrated, as it can be employed in connection with a bolt in any case where the nut is likely to become loose, and it will be seen that the arms do not interfere with applying the nut to the bolt, but by the pressure they hold it securely in place.

Having thus described my invention, I claim as new and desire to secure by Letters Patent—

1. As a new article of manufacture, a nut consisting of a thickened central body adapted to receive a bolt and reduced spring arms thereon extending laterally from the sides of the body, and returned on themselves, the returned members extending beyond the plane of one face of the nut, substantially as described.

2. As a new article of manufacture, a nut consisting of a thickened body adapted to receive a bolt and lateral spring arms thereon, returned on themselves and extending beyond the plane of one face of the nut, and yielding under pressure to lie within the said plane, substantially as described.

3. As a new article of manufacture, a nut consisting of a thickened body bored to receive a bolt, and lateral spring arms, thereon, returned on themselves and extending beyond the plane of one face of the nut, the ends of the arms being spaced a distance greater than the bore of the body for preventing their engagement with the bolt, substantially as described.

4. As an improved article of manufacture, a nut having laterally extending rigid arms, these being doubled and returned upon themselves and terminating in spring members, substantially as described.

5. As an improved article of manufacture, a nut having laterally extending arms, these being doubled and returned upon themselves, the free ends of the arms being formed into spring members with upwardly curved ends, substantially as described.

CHARLES P. DORR.

Witnesses:
FRED. K. SWETT,
JOHN A. STUART.